(12) United States Patent
Walz

(10) Patent No.: US 6,904,665 B2
(45) Date of Patent: Jun. 14, 2005

(54) METHOD AND APPARATUS FOR MACHINING WORKPIECES

(75) Inventor: Juergen Walz, Frickenhausen (DE)

(73) Assignee: EMAG Maschinenfabrik GmbH, Salach (DE)

( * ) Notice: Subject to any disclaimer, the term of this patent is extended or adjusted under 35 U.S.C. 154(b) by 19 days.

(21) Appl. No.: 10/649,346

(22) Filed: Aug. 27, 2003

(65) Prior Publication Data

US 2004/0103519 A1 Jun. 3, 2004

(30) Foreign Application Priority Data

Nov. 11, 2002 (DE) .......................................... 102 52 707

(51) Int. Cl.[7] ................................................ B23Q 7/00
(52) U.S. Cl. ...................... 29/563; 29/564; 198/377.07; 198/470.1
(58) Field of Search .......................... 29/563, 564, 33 P, 29/35.5, 36, 39, 40, 41, 42, 43, 44, 45, 46, 47, 48.5 R, 49, 48.5 A; 483/14, 15; 82/124, 125, 129; 414/222.01, 223.01, 226.01, 226.05; 198/377.07, 470.1

(56) References Cited

U.S. PATENT DOCUMENTS

| | | | | |
|---|---|---|---|---|
| 3,781,974 A | * | 1/1974 | Holzi et al. ..................... | 29/563 |
| 3,821,835 A | * | 7/1974 | St. Andre et al. ................ | 29/36 |
| 4,597,155 A | * | 7/1986 | Garnett et al. ................. | 29/564 |
| 4,608,747 A | * | 9/1986 | Link et al. ..................... | 483/14 |
| 5,321,874 A | * | 6/1994 | Mills et al. .................... | 29/563 |
| 5,636,429 A | * | 6/1997 | Croombs ..................... | 29/564.6 |
| 6,651,535 B2 | * | 11/2003 | Hafla et al. .................... | 82/122 |
| 2003/0180137 A1 | * | 9/2003 | Schuster .................. | 414/746.3 |

FOREIGN PATENT DOCUMENTS

| | | | |
|---|---|---|---|
| DE | 93 21 397 U1 | 1/1998 | |
| DE | 196 01 433 C2 | 5/1999 | |
| DE | 199 59 961 A1 | 6/2001 | |
| DE | 199 50 706 C2 | 10/2002 | |
| EP | 0 978 351 A2 | 2/2000 | |
| GB | 2166678 A * | 5/1986 | ............. B23B/3/18 |
| WO | WO 01/89761 A1 | 11/2001 | |

* cited by examiner

Primary Examiner—Derris H. Banks
Assistant Examiner—Dana Ross
(74) Attorney, Agent, or Firm—Martin Fleit; Paul D. Bianco; Fleit Kain Gibbons Gutman Bongini & Bianco P.L.

(57) ABSTRACT

Method and apparatus providing a tool turret for a machine tool with at least one motor-driven tool that is suitable for machining of wavy or tubular workpieces. The transport of the workpieces from one machining station to the next is effected in a simpler, more reliable, and less expensive fashion, because the machine tool has a tool turret that includes a gripping element for taking hold of, transporting, and positioning workpieces, rather than using an additional tool.

15 Claims, 7 Drawing Sheets

METHOD AND APPARATUS FOR MACHINING WORKPIECES

BACKGROUND OF THE INVENTION

1. Field of the Invention

The invention relates to a method and apparatus for machining workpieces, and more particularly to a machine tool equipped in a novel way with a tool turret to enable machining of wavy or tubular workpieces.

2. Prior Art

EP 0 978 351 A2 describes a device for machining workpieces with at least two adjacently arranged lathes that respectively contain a vertically arranged, rotationally driven work spindle for clamping the workpiece and at least one device for accommodating several machining tools. The rotational axes of all lathes are essentially arranged vertically in this case, and one rotating/pivoting device is respectively provided between the lathes in order to transfer the workpiece from one lathe to the next lathe after each respective machining step is completed. One disadvantage of this arrangement can be seen in the fact that a completely separate lathe with its own control, its own drive, and its own miscellaneous equipment must be provided for each machining step that is to be carried out. Another disadvantage is that a separate rotating/pivoting device needs to be provided for each transfer from one lathe to the next lathe, significantly increases construction expenses.

DE 199 59 961 A1 describes a machine tool, in particular a lathe, with several vertical workpiece spindles, wherein the workpiece can be directly transferred from one spindle to another spindle by means of receiving devices for the workpiece provided on the respective spindles. This device can only be used for machining of very specific workpieces and is particularly unsuitable for any machining of wavy or tubular workpieces.

DE 199 50 706 C2 describes a device for clamping and/or holding workpieces on a machine tool. This device comprises a gripping element that is suitable for wavy or tubular workpieces and that can be arranged on the tool table of a machine tool. The gripping element requires its own holding arrangement and its own drive, and frequently obstructs the work region of a machine tool due to the small available space. In addition, its manufacture is comparatively expensive because the gripping element requires its own holding arrangement and its own drive.

German Utility Model DE 93 21 397 U1 pertains to a lathe, wherein a tool carrier may be equipped with a gripping hand that is able to take hold of the workpiece being machined in the associated spindle and deposit said workpiece from the top onto a delivery stack arranged adjacent to the lathe.

WO 01/89761 A1 describes a device for taking hold of and transporting workpieces in lathes with several machining stations, wherein two gripping devices arranged to the right and left of each machining station serve to take hold of, transport and position the workpieces. This device also has a tool turret. However, the device merely comprises a series of individual elements, in particular gripping elements and a tool turret, but no combination of these elements, so that significant construction expenses and correspondingly high costs result.

SUMMARY OF THE INVENTION

Consequently, the invention relates to a method and apparatus comprising a machine tool that is designed in such a way that the transport of the workpieces from one machining station to the next machining station can be carried out in a much simpler, more reliable, and less expensive fashion.

This objective is attained with a machine tool with at least one machining station, with at least two gripping devices that are arranged to the right and the left of the machining station and serve for taking hold of, transporting, and positioning workpieces, and with at least one tool turret. The tool turret is provided with a gripping device that is arranged to the left and to the right, respectively, of the machining station for the purposes noted. Advantageous embodiments are disclosed herein. One embodiment of the invention is described in greater detail below with reference to the enclosed figures of the drawing.

BRIEF DESCRIPTION OF THE DRAWINGS

In the figures.

DETAILED DESCRIPTION OF PREFERRED EMBODIMENTS OF THE INVENTION

Figure 1:
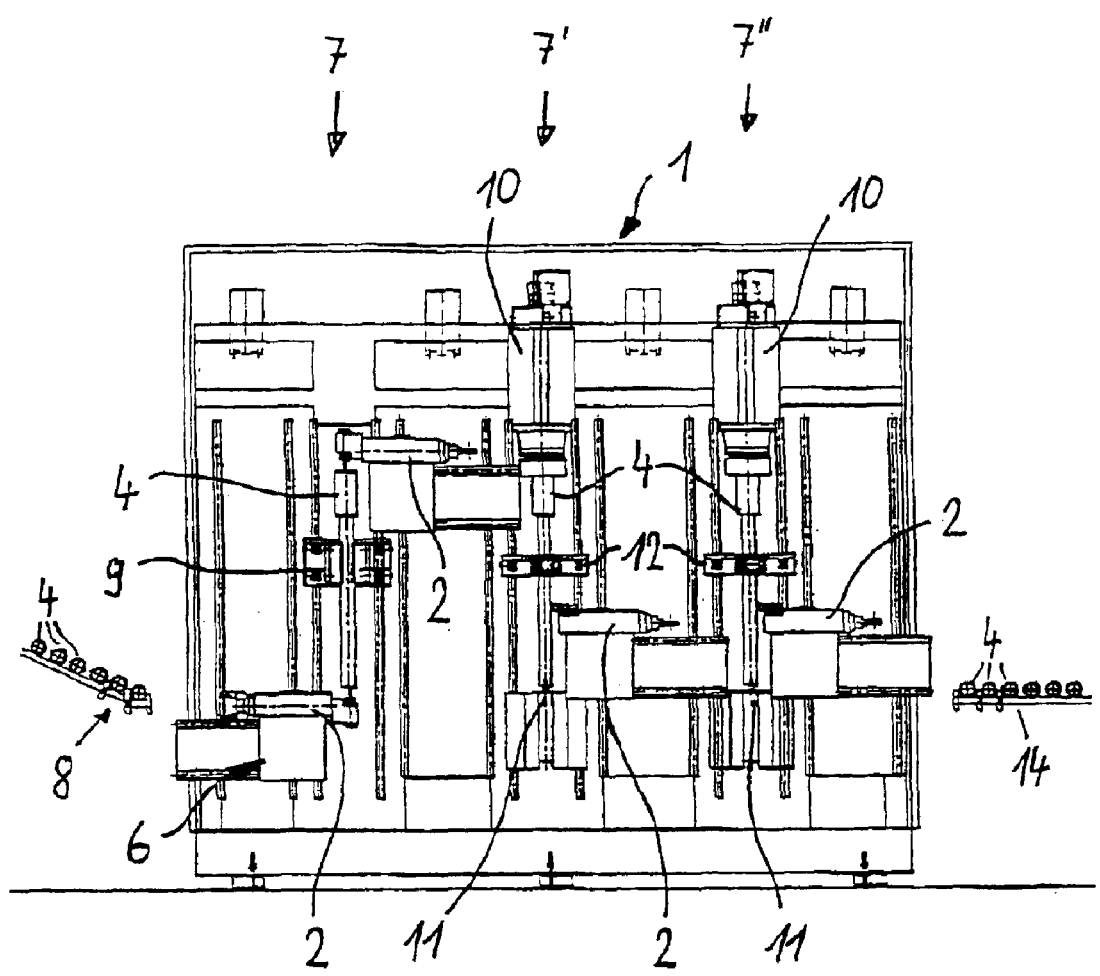
FIG. 1 is a front view of a machine tool with several machining stations.
Figure 2:
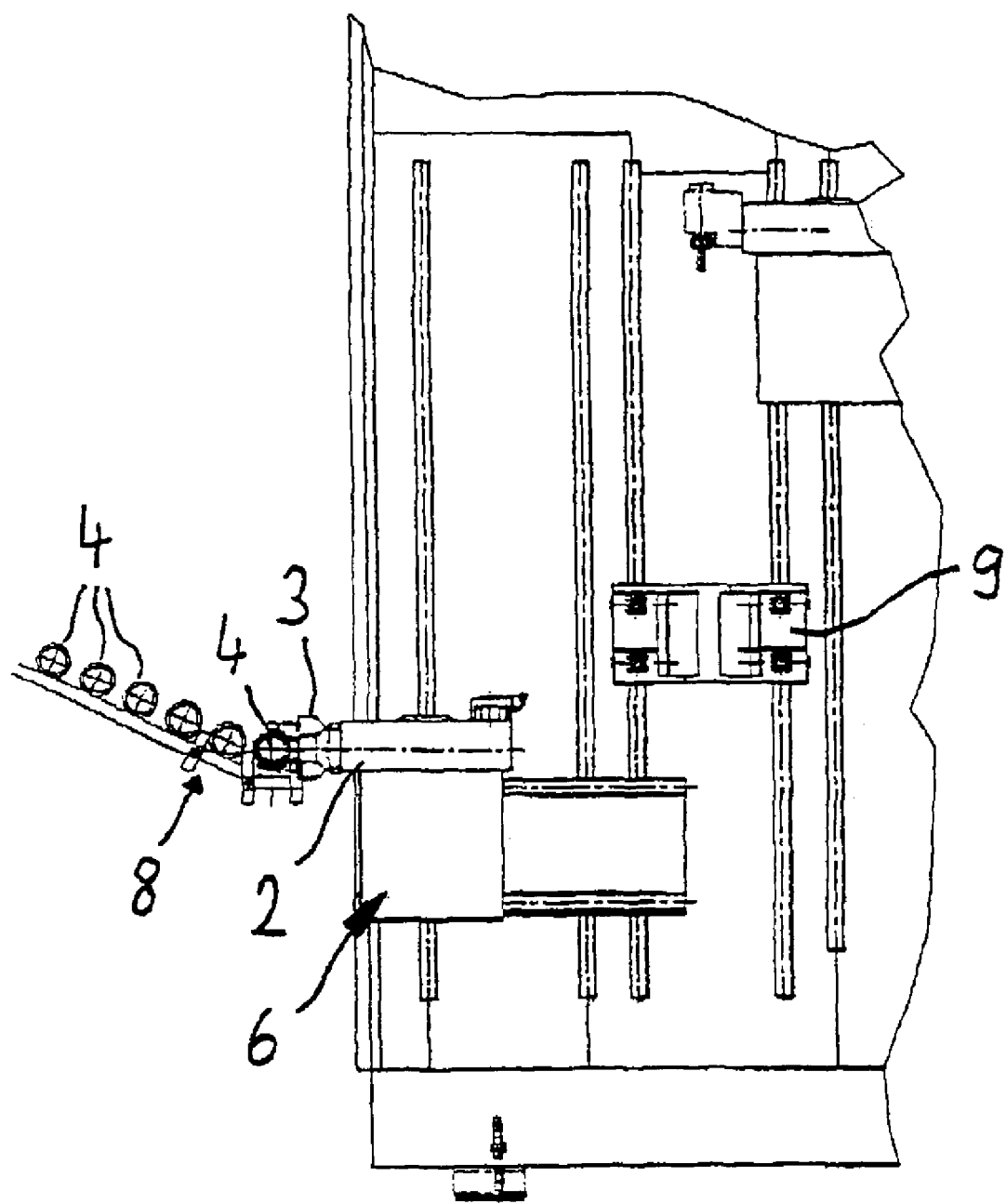
FIG. 2 is a detail of a first machining station of the machine tool shown in FIG. 1 with a workpiece feed station, wherein the gripping element is illustrated in a first position.
Figure 3:
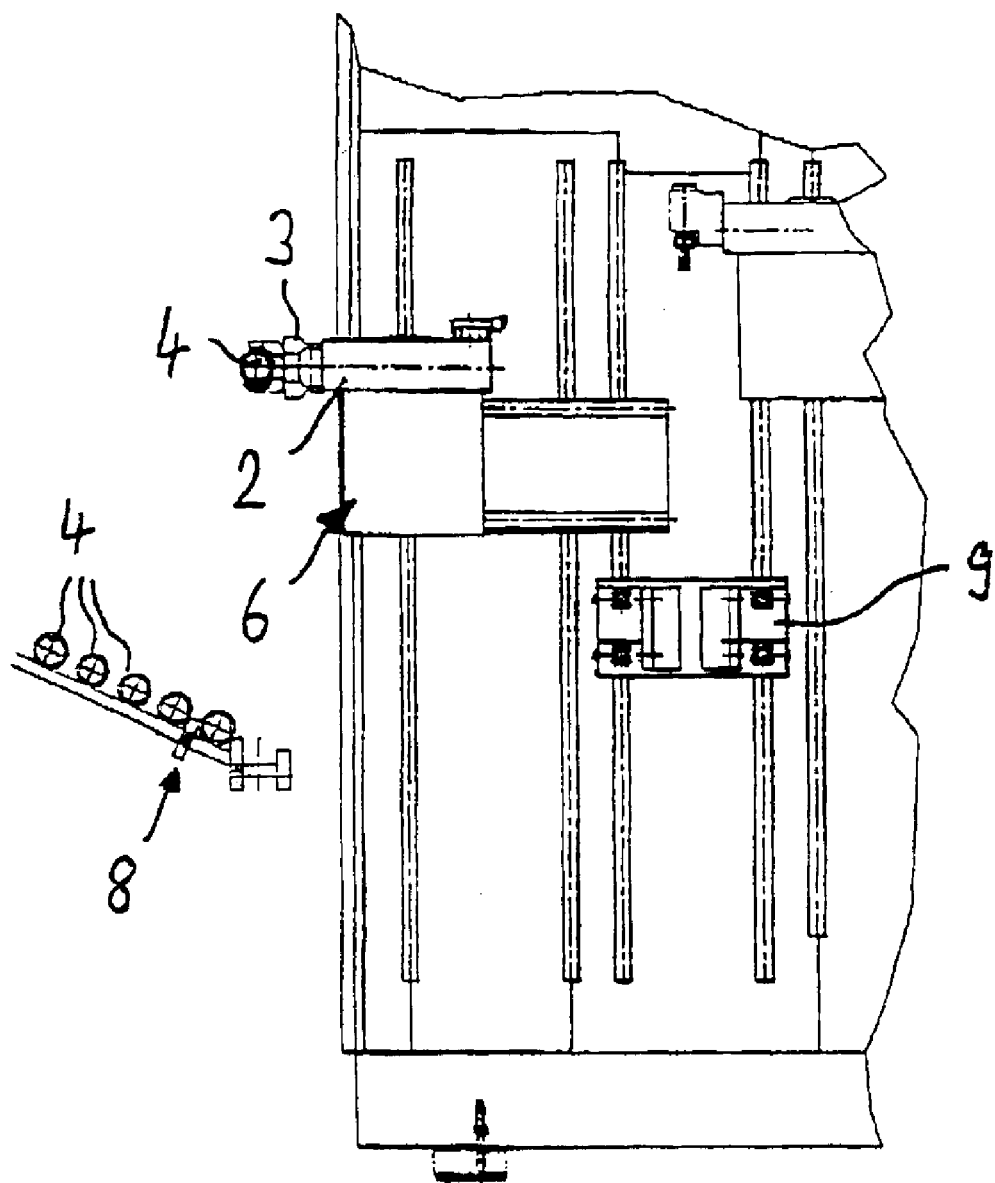
FIG. 3 is a representation according to FIG. 2, wherein the gripping element is illustrated in a second position.
Figure 4:
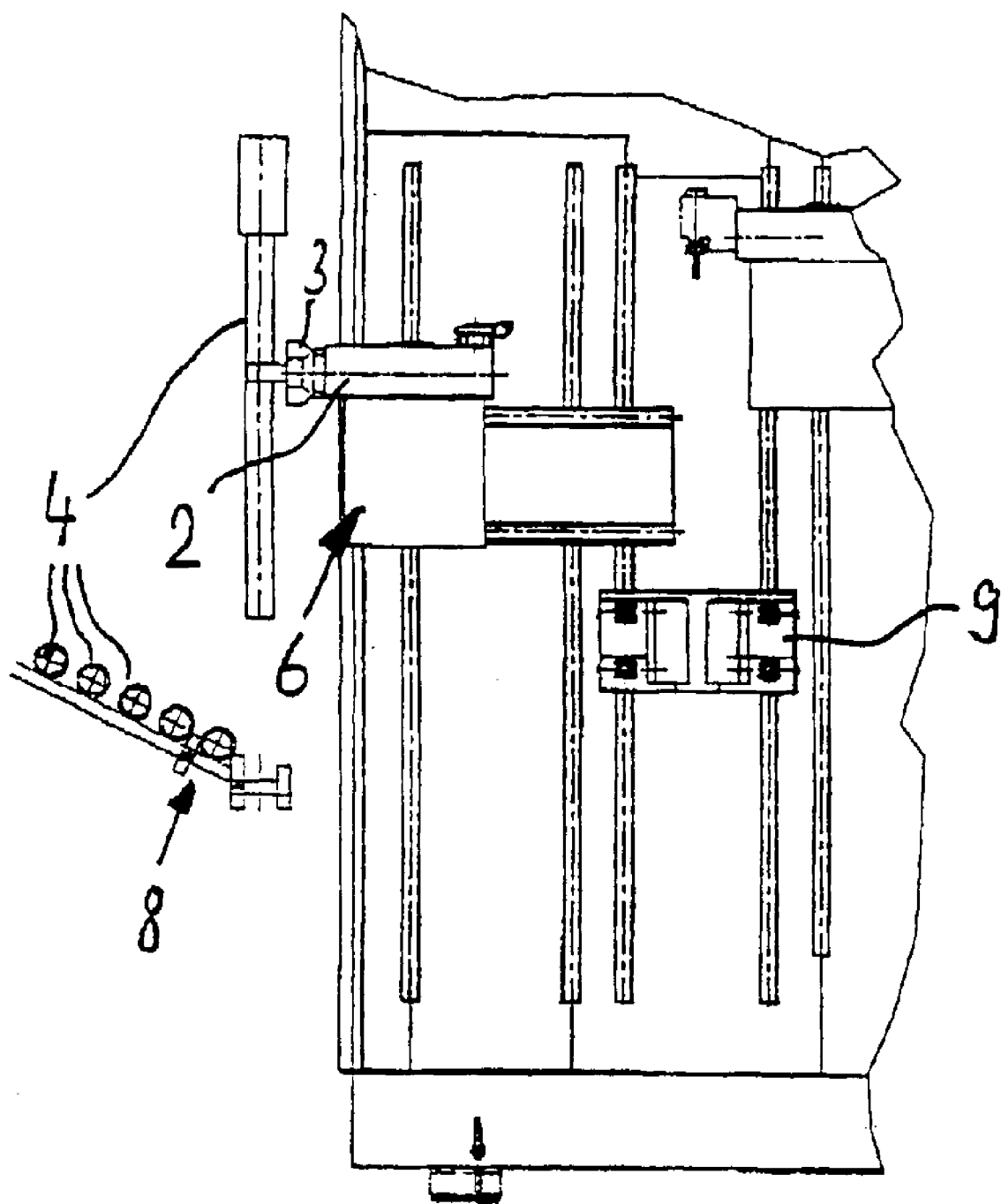
FIG. 4 is a representation according to FIGS. 2 and 3, wherein the gripping element is illustrated in a third position.

FIG. 1 shows a machine tool 1, in which components that are not essential for the invention, in particular details of the drive, the control, and the housing, are not illustrated in order to provide a better overview. The described machine tool is particularly suitable for machining workpieces 4 of wavy shape, and the following description pertains to wavy workpieces 4. The machine tool 1 consists of three successively arranged machining stations 7, 7', 7", wherein it is assumed that the workpiece 4 arriving from the workpiece feed station 8 in the form of a magazine is transported to the machining stations 7, 7', 7", and that processing of the workpiece 4 takes place in each machining station. The machining may differ from station to station, or be carried out similarly or identically in accordance with the so-called step-by-step method. In the embodiment shown, the workpiece 4 is machined differently in the successive machining stations 7, 7', 7".

Figure 5:
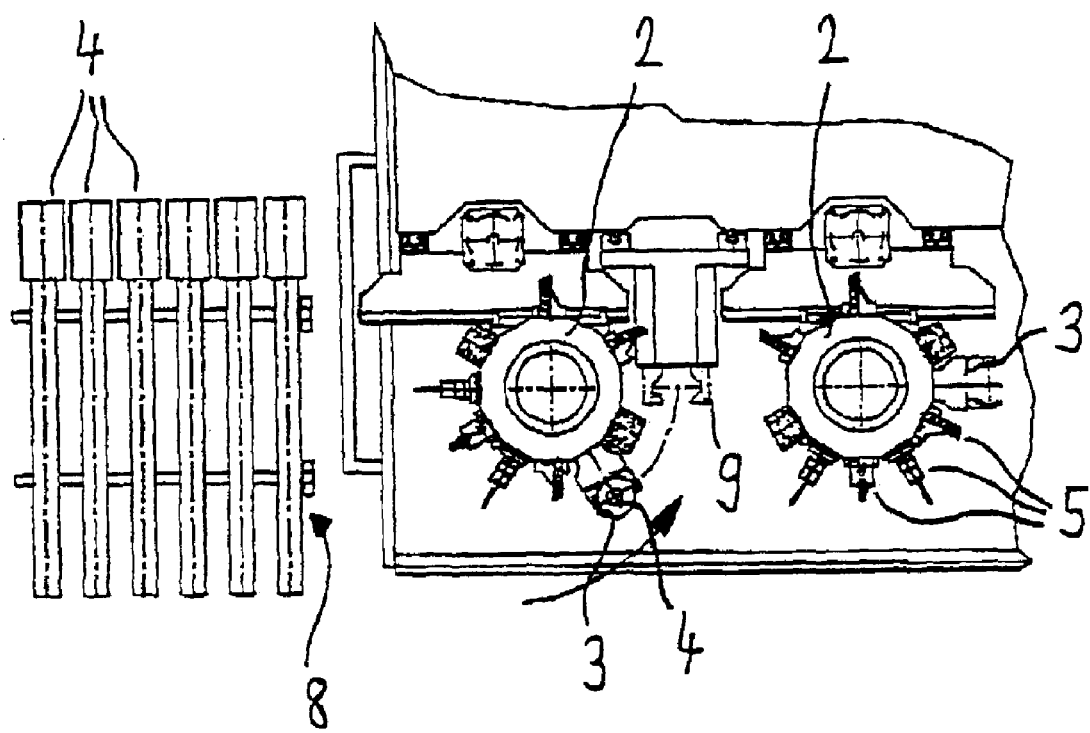
FIG. 5 is a detailed top view of two adjacent machining stations of the machine tool shown in FIG. 1, wherein the gripping element is illustrated in a fourth position.
Figure 6:
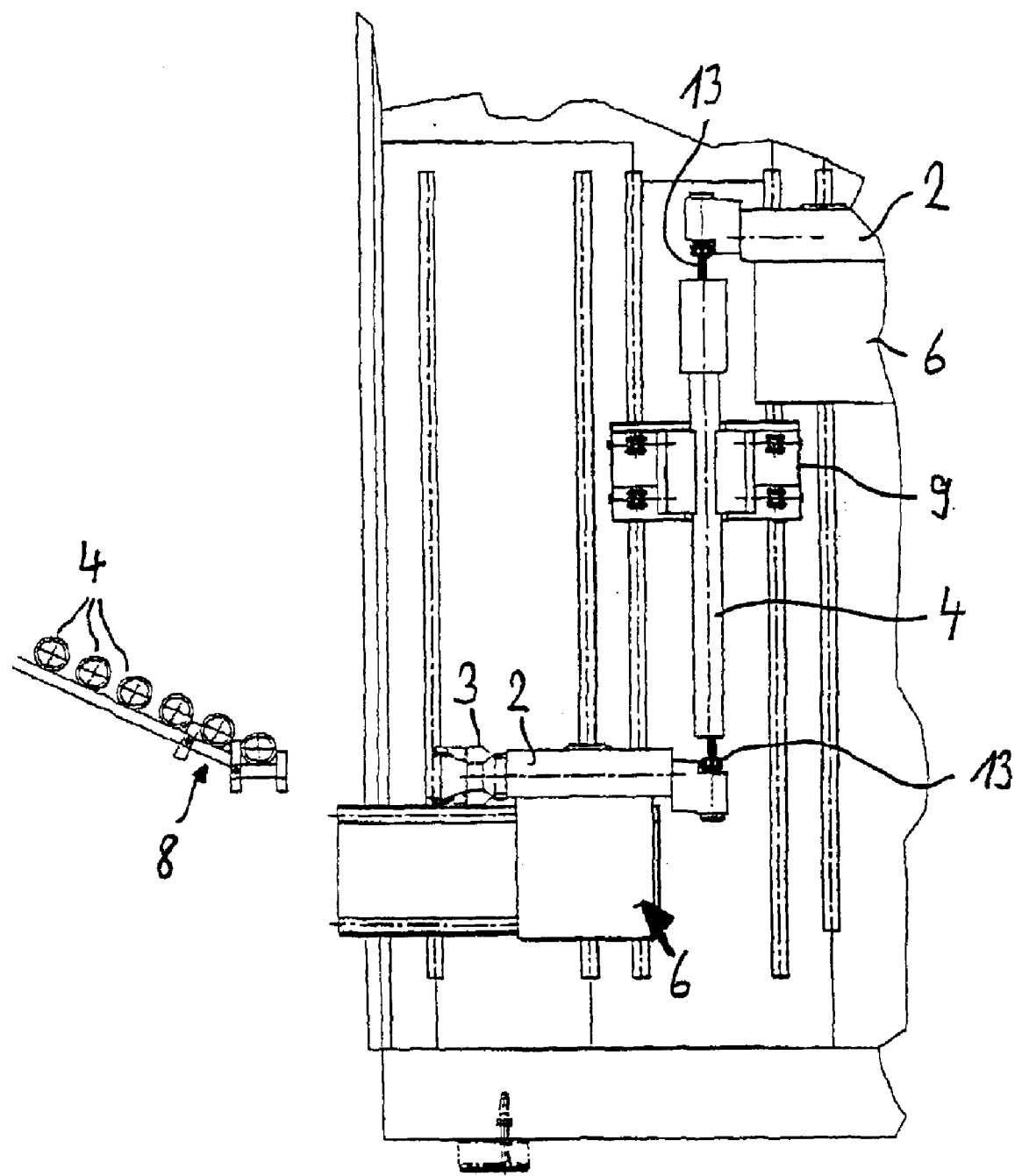
FIG. 6 is a representation according to FIGS. 2–4, wherein the gripping element is illustrated in a fifth position.

In FIG. 1, the workpiece feed station 8, realized in the form of a magazine with wavy workpieces 4, is situated to the left of the machine tool. This magazine is followed by the first machining station 7 that contains a stationary rest 9 suitable for holding the workpiece 4 to be machined in the vertical position. The first machining station 7 also contains a slide 6 in the form of a cross slide. This slide can be displaced vertically as well as horizontally and carries a tool turret 2 on its upper side. The tool turret 2 is conventionally equipped with a series of different tools 5. This is illustrated quite clearly in FIG. 5 (top view of two tool turrets 2). The tool turret conventionally comprises an active drive for activating the tools 5. FIG. 5 also shows that in one position the tool turret 2 contains a gripping element 3 instead of a tool 5. This gripping element can also be activated by the drive of the tool turret 2, and moved at least into an open position and a closed position.

The first machining station 7 is followed by a second machining station 7' that in the embodiments shown has a motor spindle 10 with a vertical axis. This motor spindle 10 is able to take hold of the workpiece 4 to be machined from the top and to set said workpiece in rotation, wherein the bottom of the workpiece is stabilized with a tailstock 11 and its center is, if so required, stabilized with a steady rest 12. Analogously to the first machining station 7, the second machining station 7' also contains a tool turret 2 supported on a slide 6 in the form of a cross slide. This tool turret 2, as well as its slide, its support, and its gripping element, are realized identically to the first machining station 7.

The second machining station 7' is followed by a third machining station 7" that is realized exactly like the second machining station 7', i.e., it is also equipped with a motor spindle 10 with a vertical axis, a tailstock 11, and, if applicable, a steady rest 12. The machine tool shown is also equipped with an additional tool turret 2 downstream of the third machining station such that each respective machining station 7, 7', 7" has an essentially identical tool turret 2 arranged on the left and on the right side on a cross slide.

The functions of the machine tool 1 and the tool turret 2 are described in greater detail below with reference to FIGS. 2–6.

The wavy workpieces 4 that arrive from the workpiece feed station 8 and lie adjacent to one another in a parallel fashion are arranged in a magazine to the left of the machine tool 1. In a first step, the cross slide 6 is displaced downward and toward the left, wherein the cross slide rotates about the vertical axis and aligns the tool turret 2 such that the gripping element faces the nearest workpiece 4. The gripping element, which can be rotated about a horizontal axis, is oriented such that it can take hold of the wavy workpiece 4. After the gripping element 3 has closed around the workpiece 4, the slide 6 is displaced upward and assumes the second position shown in FIG. 3. Subsequently, the gripping element 3 rotates about the horizontal axis by 90° such that the workpiece 4 assumes the vertically aligned third position shown in FIG. 4. The entire tool turret 2 then rotates about its central axis, as indicated by the arrow in FIG. 5, where the workpiece 4 is situated in a fourth transfer position. The tool turret ultimately reaches the fifth position, illustrated in FIG. 6, in which the workpiece 4 is taken hold of by the stationary rest 9 and clamped in this machining position.

The workpiece 4 is subsequently machined by the two tool turrets 2 arranged to the left and the right of this first machining station 7, wherein the various tools 5 of both tool turrets 2 may be conventionally utilized in order to produce holes, milled cuts, and the like on the workpiece 4. In this first machining station 7, the upper side of the workpiece 4 in particular is machined, such that it can be taken hold of by a motor spindle 10. In the embodiment shown, a face milling cutter 13 is provided for machining the walls of the wavy workpiece 4.

After the workpiece 4 has been machined in this first machining station 7, it is taken hold of, turned, and ultimately transferred to the second machining station 7' by the gripping element 3 of the tool turret 2 arranged to the right of this machining station 7. In the embodiment shown, this machining station consists of a motor spindle 10 into which the top of the wavy workpiece 4 is clamped. The bottom of the workpiece is fixed by a tailstock 11, and the central section is fixed by a steady rest 12. The so-called rough-turning of the workpiece 4 is carried out in this second machining station 7'. After this machining step is completed, the gripping element 3 of the corresponding tool turret 2 that is arranged [missing words: to the right] of the second machining station 7' takes hold of and transports the workpiece 4 to the third machining station 7", which also comprises a motor spindle 10, a tailstock 11 and a steady rest 12 in the embodiment shown, and in which the finish-turning of the workpiece is carried out. After this machining step is completed, the tool turret 2 arranged to the right of the third machining station 7" and its gripping element 3, respectively, transport the workpiece 4 to the delivery stack 14.

Figure 7:
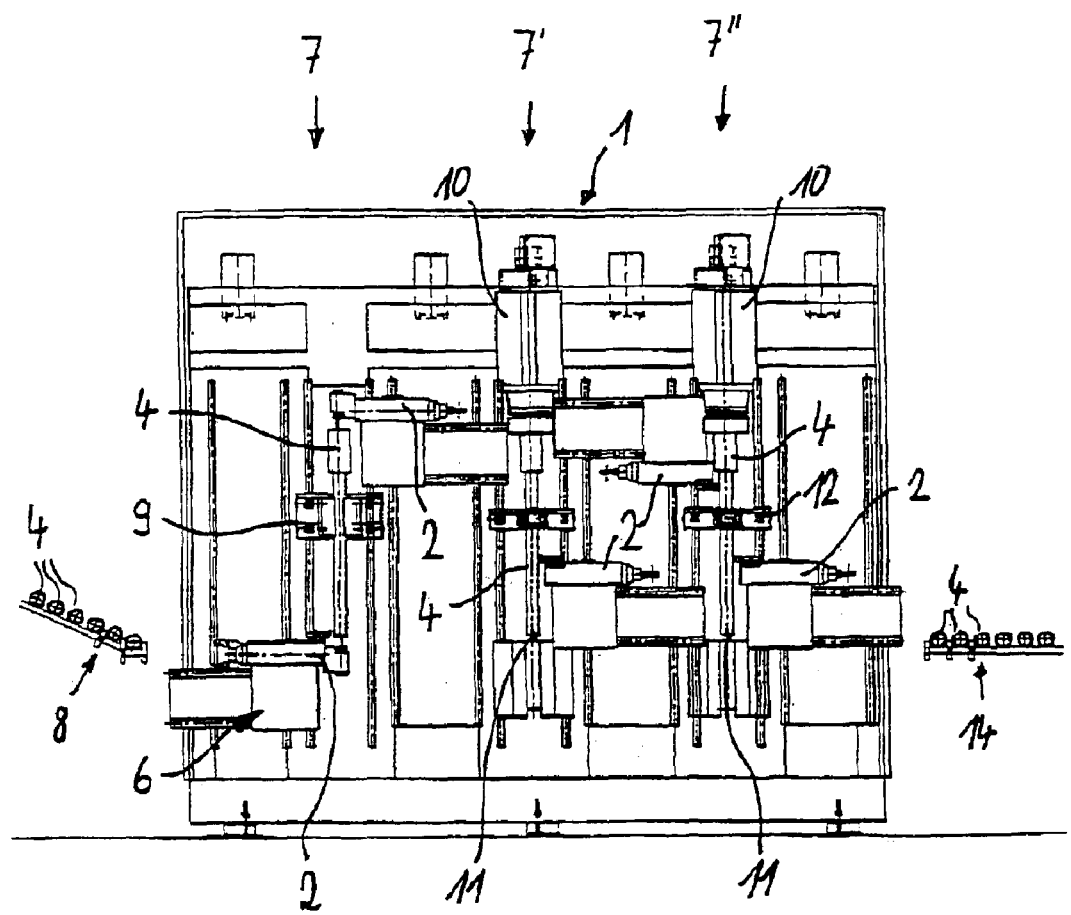
FIG. 7 is a front view of an alternative embodiment of the machine tool according to FIG. 1.

FIG. 7 shows another embodiment of the invention which, among other things, is characterized by the fact that an additional tool turret 2 is provided for the same number of machining stations 7. It is particularly important, with respect to the efficiency of the machine tool 1, to adapt the machining times in the various machining stations 7, 7' and 7" to one another. Due to the special arrangement of the tool turrets 2 and the ability to horizontally displace said tool turrets, they can be used selectively in the machining station that is adjacent on the right or the left side, depending on the respective requirements. In the embodiment according to FIG. 7, two tools of different tool turrets 2 are used simultaneously in the last machining station 7," such that 4-axis turning of the workpiece becomes possible. Since the finish-turning carried out in this second machining station 7" usually requires more time than the two other machining steps (end machining, and rough-turning), the time required for finish-turning can be cut in half by utilizing two tools. These measures make it possible to achieve approximately identical cycle times in the three machining stations 7, 7' and 7".

For example, it would also be conceivable that a milling cutter of the tool turret 2 would mill a groove in the adjacent machining station on the left side, and a grinding wheel would subsequently grind a shaft seat in the adjacent machining station on the right side. The highly flexible utilization of the tools makes it possible to significantly increase the productivity of the machine tool.

In the machine tool according to the invention and the tool turret 2 utilized therein, it is particularly advantageous that a separate device is not required to transport the workpieces 4 from one machining station to the next machining station because a gripping element 3 is integrated into the respective tool turrets 2. This eliminates components that are susceptible to wear, and the manufacturing costs are also significantly lowered, and a more compact structural design is achieved.

Another advantage of the machine tool according to the invention is that a single machine can be universally utilized for several machining steps, in particular on wavy workpieces 4. Since the invention proposes the utilization of a highly integrated construction, it is no longer necessary to arrange several independent lathes in series and to connect said lathes by means of transport devices, as is the case in the prior art.

In addition, it is particularly advantageous that the workpieces are machined in the vertical position. In contrast to devices known from the prior art in which the workpieces are arranged horizontally, this provides significant advantages with respect to available space, as well as improved accessibility for the operator and the ability to better monitor the machining steps.

What is claimed is:

1. Machine tool comprising a plurality of stations arranged serially; at least one of said stations being an oriented machining station arranged for holding a workpiece in a fixed position; first and second tool turrets each including a gripping device; said first tool turret being positioned to one side of the oriented machining station; the second tool turret being positioned to another side of the oriented machining station; the gripping device of the first tool turret for taking hold of workpieces at a preceding station, transporting, and positioning workpieces at said oriented machining station; the gripping device of the second tool turret for taking hold of transporting, and removing workpieces from said oriented machining station to a next station; and wherein the first and second tool turrets are displaceable, at the same time, into a working range of a workpiece held in said oriented machining station.

2. Machine tool according to claim 1 said wherein machining station is oriented vertically; and said gripping devices are mounted in the first and second tool turrets for rotation about a horizontal axis.

3. Machine tool according to claim 2 said serially arranged plurality of stations include least two serially consecutive vertically oriented machining stations; and the first and second tool turrets with gripping devices are positioned to the left and right of said two serially consecutive vertically oriented machining stations; a third tool turret with a gripping device is positioned between the at least two serially consecutive vertically oriented machining stations; said third turret being displaceable into working ranges of workpieces held in said at least two serially consecutive vertically oriented machining stations.

4. Machine tool according to claim 4 wherein a fourth tool turret is positioned between the at least two serially consecutive vertically oriented machining stations displaceable into working ranges of workpieces held in said at least two serially consecutive vertically oriented machining stations.

5. Machine tool according to claim 1 wherein one of the serially arranged plurality of stations is a workpiece feed station; and the first tool turret is positioned between the workpiece feed station; and the oriented machining station, with the first tool turret being displaceable into a working range of the workpiece feed station.

6. Machine tool according to claim 1 wherein one of serially arranged plurality of stations is a delivery feed station; and the second tool turret is positioned between the delivery feed station and the preceding oriented machining station, with the second tool turret being displaceable into a working range of the delivery feed station.

7. Machine tool according to claim 1, wherein the serially arranged plurality of stations includes at least three serially consecutive oriented machining stations; at least one third tool turret positioned between adjacent serially consecutive oriented machining stations, each third tool turret containing a gripping device and being displaceable into working ranges of workpieces held in said adjacent serially consecutive oriented machining stations; the first station of said serially arranged plurality of stations being a workpiece feed station; the last station of said serially arranged plurality of stations being a delivery feed station; a fourth tool turret including a gripping device positioned between the workpiece feed station and the serially first of the serially consecutive oriented machining stations, the fourth tool turret being displaceable into a working range of the workpiece feed station and a working range of a workpiece held in the serially first of the serially consecutive oriented machining stations; and a fifth tool turret including a gripping device positioned between the delivery feed station and the serially last of the serially consecutive oriented machining stations, the fifth tool turret being displaceable into a working range of the delivery feed station and a working range of a workpiece held in the serially last of the serially consecutive oriented machining stations.

8. Machine tool according to claim 7 wherein a sixth tool turret is positioned between at least one set of two serially consecutive vertically oriented machining stations, the sixth tool turret being displaceable into working ranges of workpieces held in said two serially consecutive vertically oriented machining stations.

9. Machine tool according to claim 7 wherein the at least three serially consecutive oriented machining stations are oriented vertically.

10. Machine tool according to claim 1 wherein the oriented machining station contains a stationary rest that lies within a working range of the first and second tool turrets.

11. Machine tool according to claim 10, wherein a directly driven ball screw is mounted for moving the movable slide horizontally.

12. Machine tool according to claim 1 wherein the oriented machining station comprises a motor spindle for receiving one end of workpiece; a tailstock for receiving the opposite end of workpiece; and steady rest stabilizing the central section of a workpiece.

13. Machining tool according to claim 1, wherein the serially arranged plurality of stations includes a plurality of serially consecutive oriented machining stations; and the gripping device of the second tool turret positioned at said another side of each of said oriented machining stations serves to grip a workpiece at said each said oriented machining station and transport the workpiece to the next station.

14. Machine tool according to claim 1, wherein each tool turret is mounted on a movable slide.

15. Machine tool according to claim 14, wherein the movable slide enables rectilinear movement of the tool turret.

* * * * *